(12) United States Patent
Xia

(10) Patent No.: US 11,116,349 B2
(45) Date of Patent: Sep. 14, 2021

(54) ROD-SHAPED COOKING MACHINE

(71) Applicant: Dongguan Zebao Intelligent Technology Co., Ltd, Dongguan (CN)

(72) Inventor: Qingfeng Xia, Dongguan (CN)

( * ) Notice: Subject to any disclaimer, the term of this patent is extended or adjusted under 35 U.S.C. 154(b) by 303 days.

(21) Appl. No.: 16/202,088

(22) Filed: Nov. 28, 2018

(65) Prior Publication Data

US 2020/0100614 A1    Apr. 2, 2020

(30) Foreign Application Priority Data

Sep. 27, 2018 (CN) .......................... 201821579047.8

(51) Int. Cl.
*A47J 27/10* (2006.01)
*A47J 36/32* (2006.01)

(52) U.S. Cl.
CPC ............. *A47J 27/10* (2013.01); *A47J 36/321* (2018.08)

(58) Field of Classification Search
CPC .......... A47J 27/10; A47J 36/321; A47J 36/32
USPC .......... 99/288, 330, 331, 332; 219/443, 441, 219/494, 627
See application file for complete search history.

(56) References Cited

U.S. PATENT DOCUMENTS

| | | | |
|---|---|---|---|
| 2012/0039585 A1* | 2/2012 | Colombo | D06F 39/008 392/394 |
| 2018/0344069 A1* | 12/2018 | Chan | A47J 27/10 |
| 2019/0124722 A1* | 4/2019 | Young | H05B 1/0252 |
| 2019/0183279 A1* | 6/2019 | Yang | H05B 3/80 |

FOREIGN PATENT DOCUMENTS

WO    WO-2017066692 A1 *   4/2017   .............. H05B 3/80

* cited by examiner

*Primary Examiner* — Thien S Tran
(74) *Attorney, Agent, or Firm* — Zan IP

(57) ABSTRACT

The invention relates to a rod-shaped cooking machine, which includes a rod-shaped hollow housing. The top of the housing is provided with a touch screen assembly, the bottom of the housing is provided with a bottom cover. Inside the housing, a main PCB plate is arranged near the touch screen assembly, a heating assembly is arranged near the bottom cover, a stirring assembly is arranged between the main PCB plate and the heating assembly. The stirring assembly has a motor and a stirring rod set on the motor. The heating assembly has a plastic cylinder. The stirring rod reaches into the plastic cylinder cylinder; the middle part of the housing is provided with an inlet connecting the plastic cylinder, and the bottom cover is provided with a drain port connected to the plastic cylinder.

9 Claims, 6 Drawing Sheets

ROD-SHAPED COOKING MACHINE

FIELD OF THE INVENTION

The present invention relates to the technical field of a cooking machine, particularly, relates to a rod-shaped cooking machine.

BACKGROUND OF THE INVENTION

Cooking has always been the main labour of modern families. The rhythm of people's life is getting faster and faster, so they don't have more time to prepare for cooking. It is urgent to use smart kitchens to cook delicious food for people. In recent years, with the rapid development of artificial intelligence, the application of smart robot is more and more extensive, and it is an inevitable trend to apply smart robot in cooking field. However, it is difficult to solve the problem of combining human experience and skills in food making with smart robots. The existing cooking robots occupy large space, have a large system and complex operation, so they are not convenient to be used in ordinary people's homes.

SUMMARY OF THE INVENTION

In order to overcome the shortcomings of the prior art, the present invention provides a rod-shaped cooking machine, which is portable, light in weight and convenient to be used in ordinary people's homes.

The technologies in the present invention are as follows:

A rod-shaped cooking machine includes a rod-shaped hollow housing. The top of the housing is provided with a touch screen assembly, the bottom of the housing is provided with a bottom cover. Inside the housing, a main PCB plate is arranged near the touch screen assembly, a heating assembly is arranged near the bottom cover, a stirring assembly is arranged between the main PCB plate and the heating assembly. The stirring assembly has a motor and a stirring rod set on the motor. The main PCB plate is electrically connected with the motor and the heating assembly to control its operation. The heating assembly has a plastic cylinder and an electric heating sheet arranged on the plastic cylinder, and a ring seat arranged on the end of the plastic cylinder, which is sealed connect the housing and the bottom cover. The stirring rod reaches into the plastic cylinder; the middle part of the housing is provided with an inlet connecting the plastic cylinder, and the bottom cover is provided with a drain port connected to the plastic cylinder. After the water enters the plastic cylinder, it is heated by the heating assembly. The motor drives the stirring rod to rotate and stir so that the water temperature is uniform and the water is discharged through the drain port.

The ring seat is fixed at one end of the plastic cylinder and has a ring wall which is sealed with the housing through a sealing ring; the ring wall and the bottom cover are clamped.

The ring seat is provided with a bearing surface, the plastic cylinder is fixed on the bearing surface; the bearing surface is also provided with a through hole connected to the plastic cylinder.

The stirring assembly also includes a motor isolation slot, a motor shaft, a connecting shaft, a sealing ring and a stirring blade; the motor is placed in the motor isolation slot, the motor shaft is arranged on the motor and passes through the motor isolation slot and extends into the plastic cylinder; one end of the connecting shaft is fixed on the motor shaft, the other end of the connecting shaft is fixed to the stirring rod; the stirring rod is fixed connected the stirring blade member; the stirring blade member has a hollow shaft and fan blades arranged on the hollow shaft; the center of the bottom cover is provided with a positioning shaft which is inserted into the hollow shaft, the motor drives the stirring rod and the stirring blade member to rotate.

The stirring rod passes through the through hole, the stirring blade member is in the space between the ring seat and the bottom cover.

A circuit board mounting frame is mounted on the motor isolation slot, the main PCB board is connected with the circuit board mounting frame.

The plastic cylinder is provided with a fuse, a controlled silicon, an anti-dry-burn NTC, stainless steel heat-generating sheets, a temperature detector.

The touch screen includes key-press sticker, a panel, a controlling PCB board, shading members and an waterproof ring; the key-press sticker adheres to the panel, and the controlling PCB board is provided with touch keys and a LCD display screen; the controlling PCB board is fixed to the panel with screws. The controlling PCB board is provided with touch springs, the touch springs are arranged within the shading members, the shading members are welded to the controlling PCB board. The periphery of the panel and the top edge of the housing are respectively provided with matching buckles and slots, both of which are connected by the buckles and the slots. The panel is provided with the waterproof ring along its periphery to seal the controlling PCB board, therefor avoiding water entering the PCB board.

The middle part of the housing is pivoted with a handle.

The beneficial effect of the present invention is as follows: 1. In the cooking machine, the water is heated by the heating device. 2. In the cooking machine, the stirring assembly and the bottom cover is detachable which is facilitate to cleaning and maintenance. 3. In the cooking machine, the water lever detector is used to prevent overfull water and less water drying phenomenon. 4. Through its operating system, the cooking machine makes the product more smart and convenient, which can record data and optimize cooking scheme.

DETAILED DESCRIPTION OF ILLUSTRATED EMBODIMENTS

The follows will further descript the present invention with the embodiments, which are the preferable embodiments in the present invention.

Figure 1:
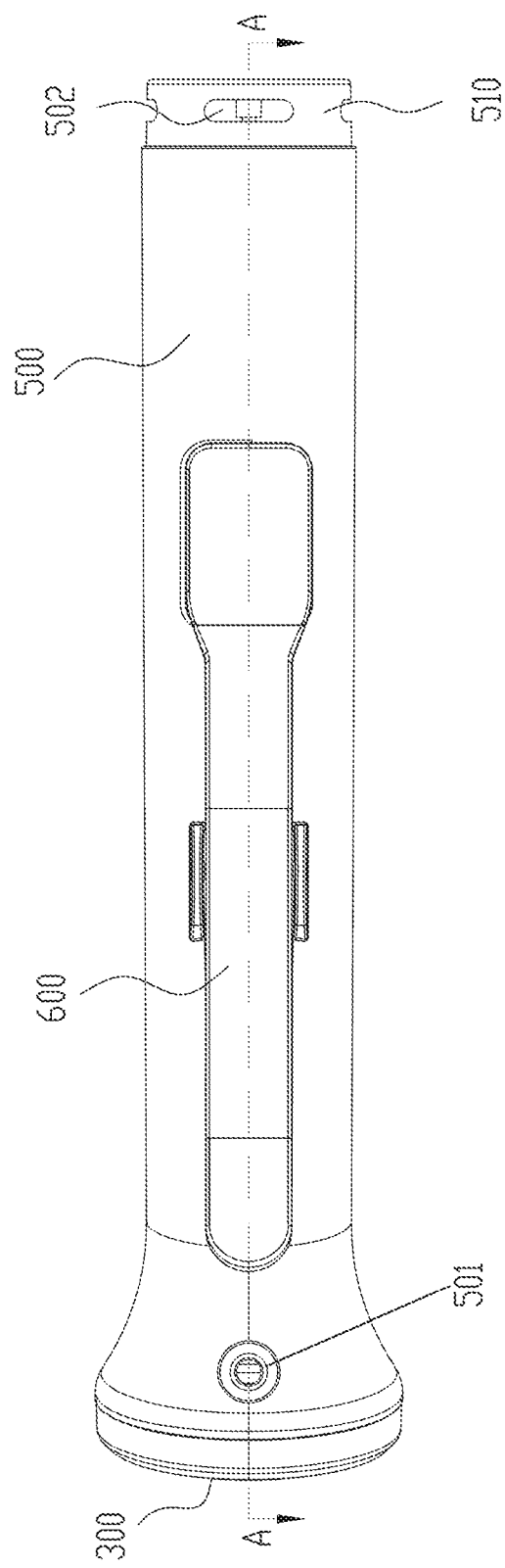
FIG. 1 is a diagram of the rod-shaped cooking machine of the present invention.
Figure 2:
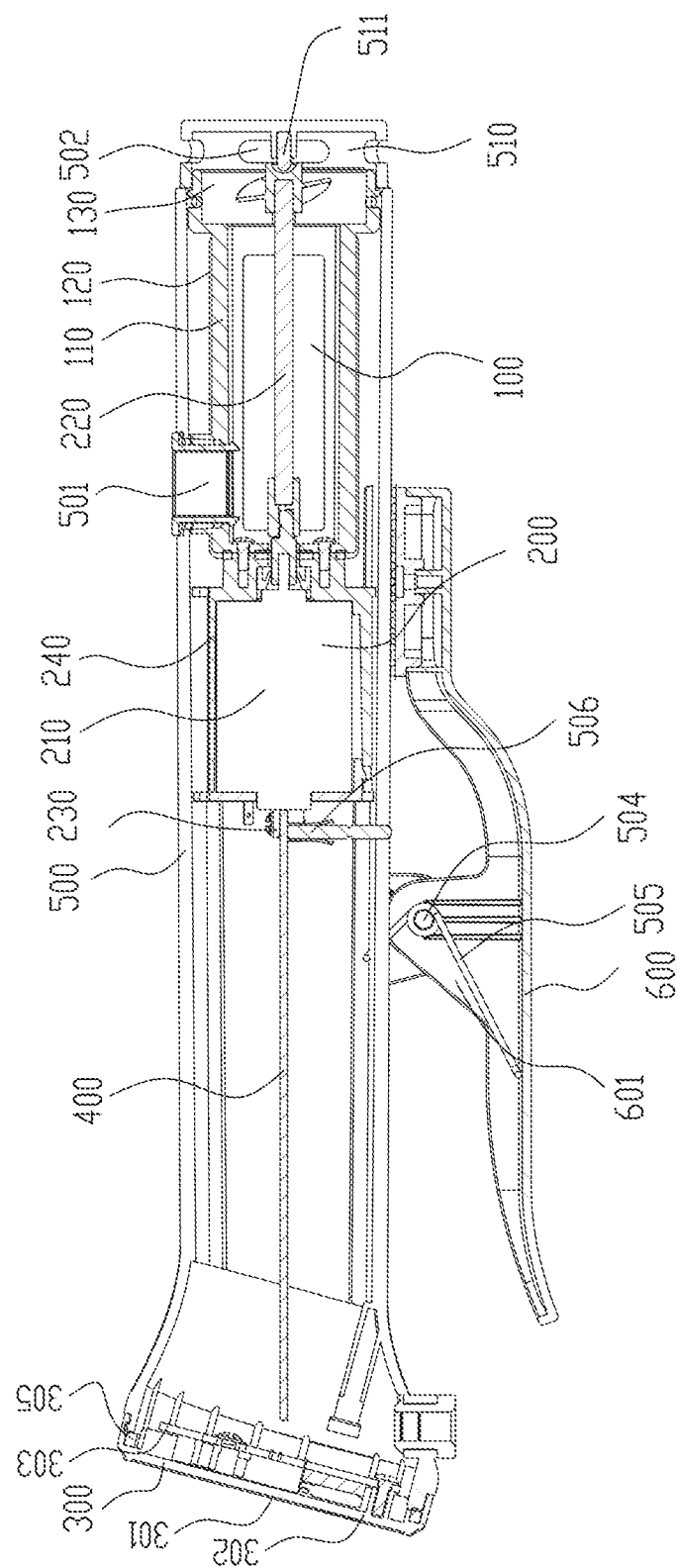
FIG. 2 is a section along the A-A line in FIG. 1.

Referring to FIG. 1 and FIG. 2, A rod-shaped cooking machine includes a rod-shaped hollow housing 500. The top of the housing 500 is provided with a touch screen assembly 300, the bottom of the housing 500 is provided with a bottom cover 510. Inside the housing 500, a main PCB plate 400 is arranged near the touch screen assembly 300, a heating assembly 100 is arranged near the bottom cover 510, a stirring assembly 200 is arranged between the main PCB plate 400 and the heating assembly 100. The stirring assembly 200 has a motor 210 and a stirring rod 220 set on the motor 210. The main PCB plate 400 is electrically connected with the motor 210 and the heating assembly 300 to control its operation. The heating assembly 100 has a plastic cylinder 110 and an electric heating sheet 120 arranged on the plastic cylinder 110, and a ring seat 130 arranged on the end of the plastic cylinder 110, which is sealed connect the housing 500 and the bottom cover 510. The stirring rod 220 reaches into the plastic cylinder cylinder 110. The middle part of the housing 500 is provided with an inlet connecting the plastic cylinder 110, and the bottom cover 510 is provided with a drain port 511 connected to the plastic cylinder 110. After the water enters the plastic cylinder 110, it is heated by the heating assembly 100, and the motor 210 drives the stirring rod 220 to rotate and stir so that the water temperature is uniform and the water is discharged through the drain port 511.

Figure 3:
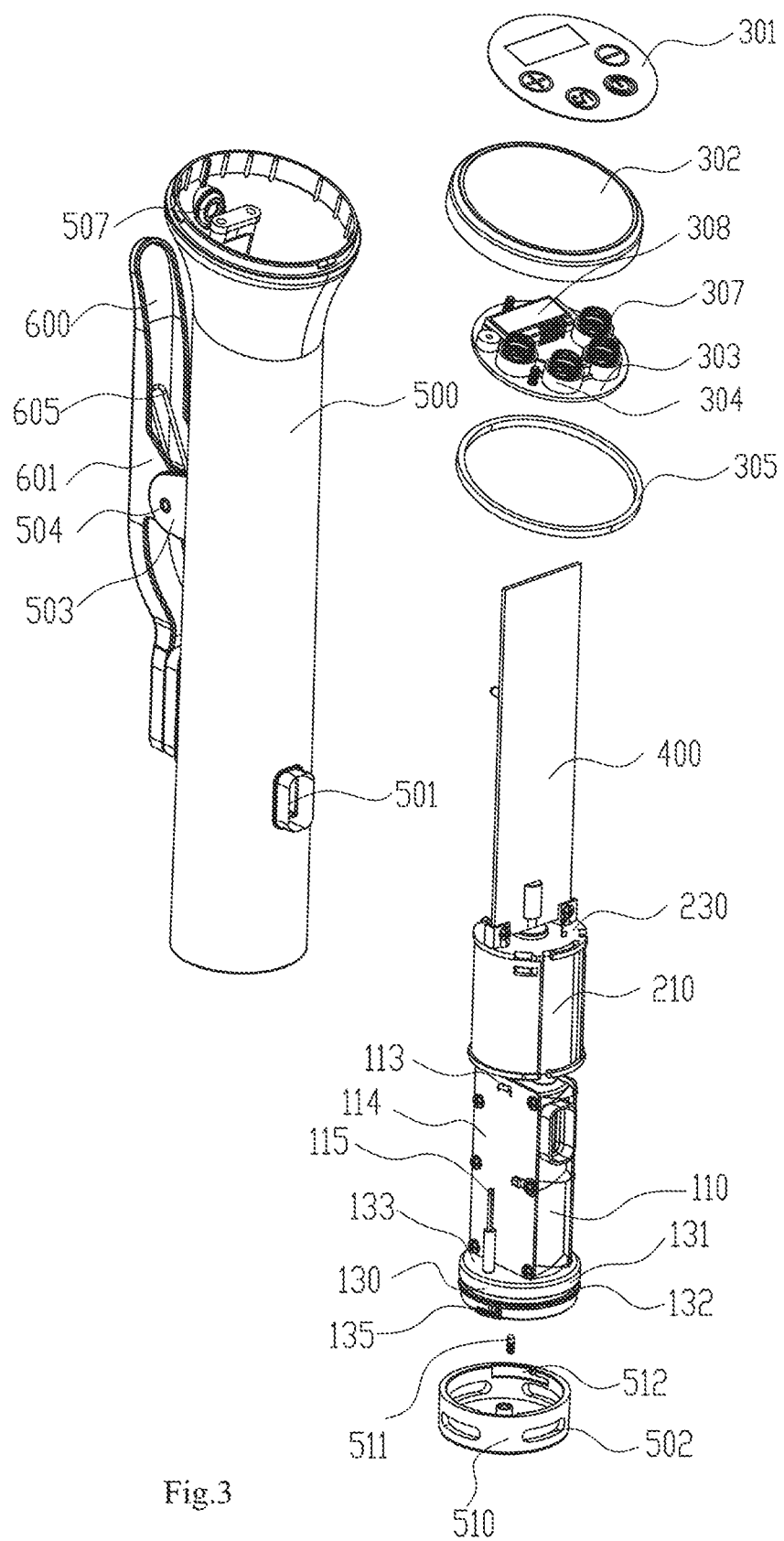
FIG. 3 is an explosion diagram of the rod-shaped cooking machine of the present invention.

Referring to FIG. 3, the ring seat 130 is fixed at one end of the plastic cylinder 110 and has a ring wall 131. The ring wall 131 is provided with a sealing ring 132, and the ring seat 130 is sealed with the housing 500 through the sealing ring 132. The ring wall 131 and the bottom cover 510 are respectively provided with a matching slot 135 and a buckle 512, so that the two are clamped.

The ring wall 131 is provided with a bearing surface 133. The plastic cylinder 110 is fixed on the bearing surface 133. The bearing surface 133 is also provided with a through hole 134 connected to the plastic cylinder 110. The bottom cover 510 is rotated so as to remove the ring wall 131 and the bottom cover 510 to expose the heating assembly 100, thereby facilitating the cleaning of the plastic cylinder 110.

Figure 4:
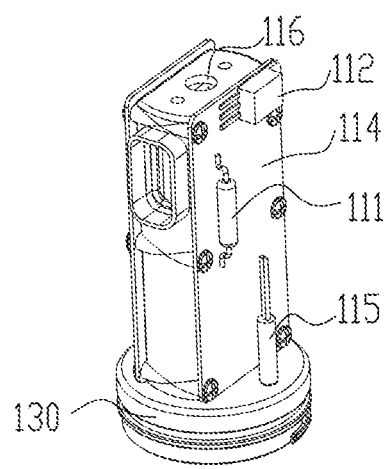
FIG. 4 is a stereo diagram of the heating device of the rod-shaped cooking machine of the present invention.

Referring to FIG. 3 and FIG. 4, the plastic cylinder 110 is provided with a fuse 111, a controlled silicon 112, an anti-dry-burn NTC 113, stainless steel heat-generating sheets 114, a temperature detector 115, and a hole 116. The plastic cylinder 110 is a rectangular parallelepiped shape, and is hollow inside and provided with the round hole 116 on the top of it. The stainless steel heat-generating sheets 114 are fixedly connected to both side surfaces of the plastic cylinder 110 by screws. The stainless steel heating sheet 114 is respectively arranged with the anti-dry-burn NTC 113, the fuse 111, the controlled silicon 112. The temperature detector 115 is fixed under the stainless steel heating sheet 114 and is electrically connected with it, and the temperature detector 115 is fixed to the ring seat 130. The anti-dry-burn NTC 113 detects and prevents dry burning phenomenon. The controlled silicon 112 accurately adjusts temperature and can adjust power according to water temperature. Resistance wires are distributed on the heating sheets 114, and the material of the resistance wire is a rare earth heating wire, the thermal efficiency of the heating wire is very high. After electrification, the two stainless steel heaters 114 are heated, and the heat is transmitted to water.

Referring to FIG. 2 and FIG. 3, the touch screen 300 includes key-press sticker 301, a panel 302, a controlling PCB board 303, shading members 304 and an waterproof ring 305. The key-press sticker 301 adheres to the panel 302, and the controlling PCB board 303 is provided with touch keys and a LCD display screen 308. The control PCB plate 303 is fixed to the panel 302 with screws. The controlling PCB board 303 is provided with touch springs 307, the touch springs are arranged within the shading members 304, the shading members 304 are welded to the controlling PCB board 303. The periphery of the panel 302 and the top edge of the housing 500 are respectively provided with matching buckles and slots, both of which are connected by the buckles and the slots. The panel 302 is provided with the waterproof ring 305 along its periphery to seal the controlling PCB board 303, therefor avoiding water entering the controlling PCB board 303.

Referring to FIG. 2 and FIG. 3, the middle part of the housing 500 is pivoted with a handle 600, thereby facilitating the use of the cooking machine. In particular, a first flange 503 is arranged in the middle of the housing 500, a second flange 601 is arranged in the handle 600, and the first flange 503 and the second flange 601 are pivoted through a pin 504. A torsion spring 505 is mounted on the pin 504. One end of the torsion spring 505 is attached to the housing 500 and the other end of the torsion spring 505 is attached to the handle 600. The top of the housing 500 is gradually widened in radial direction and a inclined plane is formed. The housing 500 is provided with a water lever detector 506, and the water lever detector 506 is fixed connected with the main PCB board 400. The water level detector 506 is detect the water level. When the water in the plastic cylinder 110 is below the lowest water level or or above the highest water level, the rod-shaped cooking machine does not work. The housing 500 is provided with the power line sheath 507 under the touch screen 300.

Figure 5:
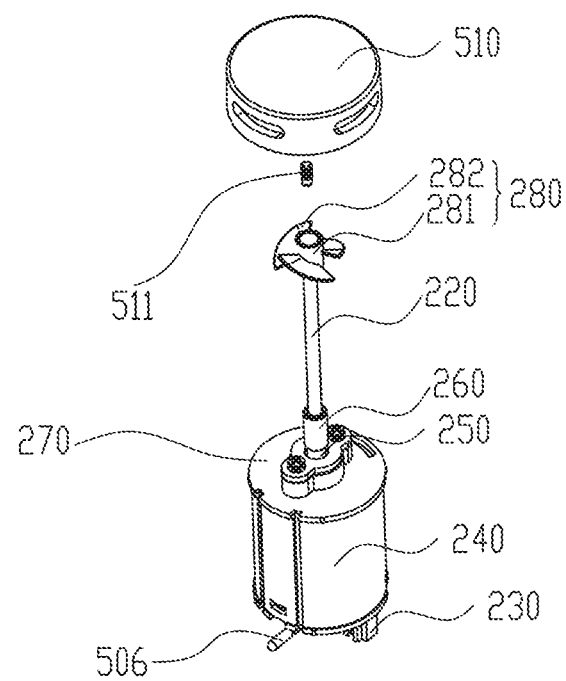
FIG. 5 is a diagram of the heating device of the rod-shaped cooking machine of the present invention.

Referring to FIG. 5, The stirring assembly 200 also includes a circuit board mounting frame 230, a motor isolation slot 240, a motor shaft 250, a connecting shaft 260, a sealing ring 270 and a stirring blade 280. The motor 210 is placed in the motor isolation slot 240. The motor shaft 250 is arranged on the motor 210 and passed through the motor isolation slot 240 and extended into the plastic cylinder 110. One end of the connecting shaft 260 is fixed on the motor shaft 250, and the other end of the connecting shaft 260 end is fixed to the stirring shaft 220. The stirring shaft 220 is fixed connected the stirring blade member 280. The stirring blade member 280 has a hollow shaft 281 and fan blades 282 provided on the hollow shaft 281. The center of the bottom cover 510 is provided with a positioning shaft 511 which is inserted into the hollow shaft 281. The motor 210 drives the stirring rod 220 and the fan blade 282 to rotate.

Figure 6:
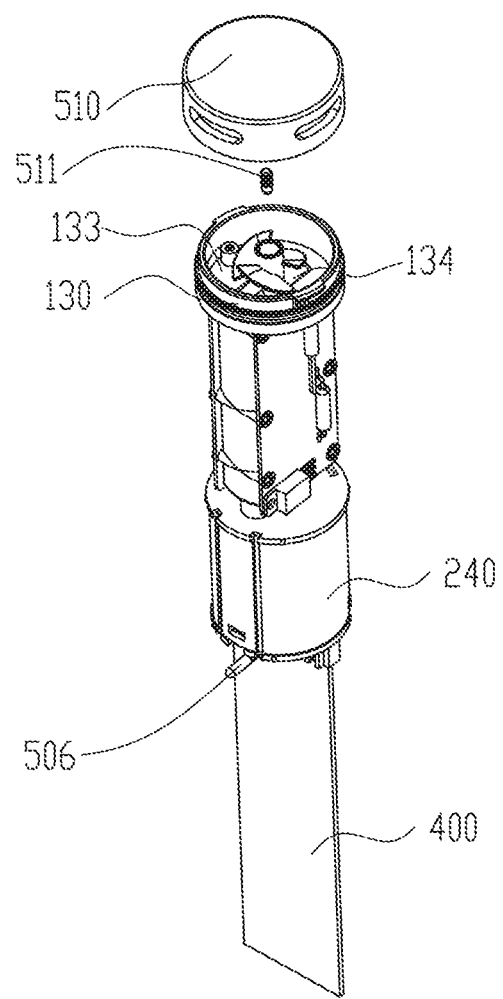
FIG. 6 is a diagram of the sound control system of the rod-shaped cooking machine of the present invention.

Referring to FIG. 6, the bearing surface 133 of the ring seat 130 is provided with the through hole 134. The stirring rod 220 passes through the through hole 134. The stirring blade member 280 is in the space under the bearing surface 134 of the ring seat 130, that is, the space between the ring seat 130 and the bottom cover 510.

The circuit board mounting frame 230 is mounted on the motor isolation slot 240. The main PCB board 400 is connected with the circuit board mounting frame 230.

The sealing ring 270 is arranged on the motor isolation slot 240 at the extension position of the motor shaft 250 to prevent water from entering the motor.

The controlling PCB board 303, the motor 210, the stainless steel heating sheet 114, the controlled silicon 112, the anti-dry-burn NTC 113, the water level detector 506 and the temperature detector 115 are electrically connected with the main PCB plate 400. The main PCB plate 400 provides power for them.

Figure 7A:
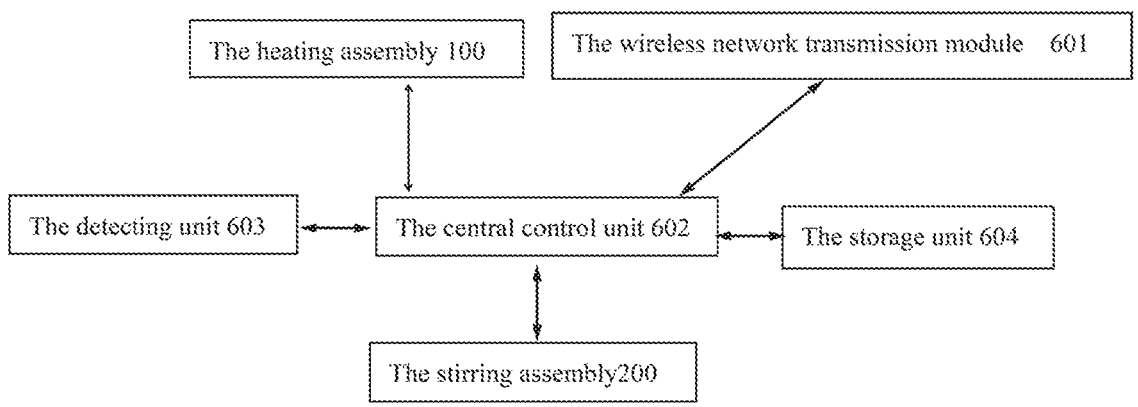
FIG. 7a is a diagram of the operating system of the rod-shaped cooking rod.
Figure 7B:
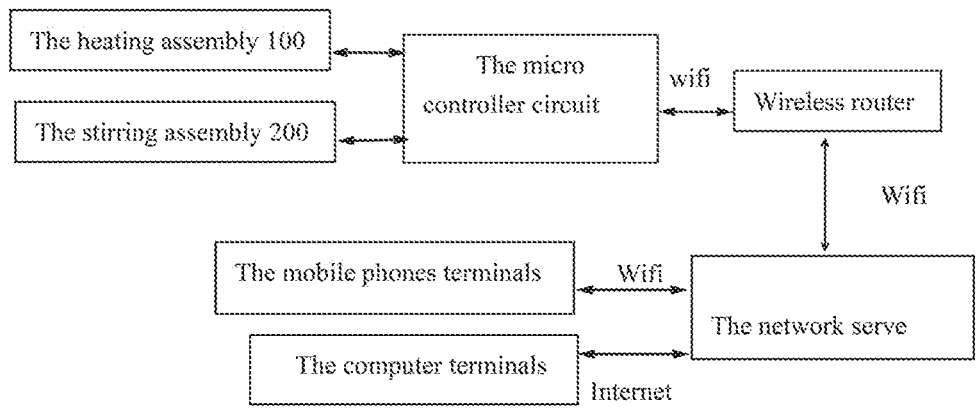
FIG. 7b is a diagram of the signal transmission of the operating system.

Referring to FIG. 7a and FIG. 7b, An operating system of the rod-shaped cooking machine comprises a wireless network transmission module 601, a central control unit 602, a detecting unit 603, a storage unit 604, the heating assembly 100 and the stirring assembly 200.

The wireless network transmission module 601, the detecting unit 603, the storage unit 604, the heating assembly 100 and the stirring assembly 200 are electrically connected and signal connected with the central control unit 602, respectively.

The wireless network transmission module 601 is used for receiving remote control instructions sent by a computer.

The central control unit 602 is used for sending corresponding commands to control the detecting unit 603, the storage unit 604, the heating assembly 100 and the stirring assembly 200 according to the remote control instructions received by the wireless network transmission module 601.

The detecting unit 603 is used to detect temperature through the temperature detector 115 and to detect water level through the water level detector 506 and prevent from drying and alarm according to the corresponding command issued by the central control unit 602.

The heating assembly 100 is used for heating to a specified temperature according to the corresponding command issued by the central control unit 602.

The stirring assembly 200 is used for stirring water so as to make the water and heat transfer more quick, so that the water is evenly heated according to the corresponding command issued by the central control unit 602.

The storage unit 604 is used for recording a command issued by the central control unit 602 to the detection unit 603, the heating assembly 100 and the stirring assembly 200 forming a corresponding recipe.

The module circuit of the heating assembly 100 and that of the stirring assembly 200 communicate with the micro controller circuit with the WIFI module through the RS422 serial port communication protocol, respectively, so as to achieve the networking function of each module of the cooking machine. Wireless router as the user's wireless network switch enables the cooking machine to access the gateway to send its own state information to the network server and obtain the network server control command. There is an smart cooking menu system in the web server, which can compare the status information of cooking machine and the menu content, and get a cooking task that can be accomplished by cooking machine. Then It is sent to mobile phones and computer terminals.

The above content is a further detailed explanation of the present invention in combination with the specific optimal implementation mode, and it cannot be assumed that the concrete implementation mode of the present invention is limited to these instructions only. For the common technical personnel in the technical field of the present invention, the structure form of the present invention can be flexible and changeable, and a series of products can be derived without departing from the concept of the present invention. A number of simple deductions or replacements shall be deemed to fall within the scope of patent protection determined by the submitted claims.

I claim:

1. A rod-shaped cooking machine, which includes a rod-shaped hollow housing, a top of said housing is provided with a touch screen assembly, a bottom of said housing is provided with a bottom cover, wherein inside said housing, a main PCB plate is arranged near said touch screen assembly, a heating assembly is arranged near said bottom cover, a stirring assembly is arranged between said main PCB plate and said heating assembly; said stirring assembly has a motor and a stirring rod set on said motor; said main PCB plate is electrically connected with said motor and said heating assembly to control said motor and said heating assembly to operate; said heating assembly has a plastic cylinder and an electric heating sheet arranged on said plastic cylinder, and a ring seat arranged on a end of said plastic cylinder, which is sealed connect to said housing and said bottom cover; said stirring rod reaches into said plastic cylinder; a middle part of said housing is provided with an inlet connecting said plastic cylinder, and said bottom cover is provided with a drain port connected to said plastic cylinder; after water enters said plastic cylinder, said water is heated by said heating assembly, and said motor drives said stirring rod to rotate and stir so that water temperature is uniform and said water is discharged through said drain port;

wherein said touch screen includes a key-press sticker, a panel, a controlling PCB board, shading members and an waterproof ring; said key-press sticker adheres to said panel, and said controlling PCB board is provided with touch keys and a LCD display screen; said controlling PCB board is fixed to said panel with screws; said controlling PCB board is provided with touch springs, said touch springs are arranged within said shading members, said shading members are welded to said controlling PCB board; a periphery of said panel and a top edge of said housing are respectively provided with matching buckles and slots, said panel and said panel are connected by said buckles and said slots; said panel is provided with said waterproof ring along said periphery of said panel to seal said controlling PCB board, therefor avoiding said water entering said controlling PCB board.

2. The rod-shaped cooking machine according to claim 1, wherein said ring seat is fixed at one end of said plastic cylinder and has a ring wall, said ring wall is sealed with said housing through a sealing ring; said ring wall and said bottom cover are clamped.

3. The rod-shaped machine according to claim 2, wherein said ring seat is provided with a bearing surface; said plastic cylinder is fixed on said bearing surface.

4. The rod-shaped cooking machine according to claim 1, wherein said stirring assembly also includes a motor isolation slot, a motor shaft, a connecting shaft, a sealing ring and a stirring blade; said motor is placed in said motor isolation slot, said motor shaft is arranged on said motor and passes through said motor isolation slot and extends into said plastic cylinder; one end of said connecting shaft is fixed on said motor shaft, the other end of said connecting shaft is fixed to said stirring shaft; said stirring rod is fixed connected to said stirring blade member; said stirring blade member has a hollow shaft and fan blades arranged on said hollow shaft; a center of said bottom cover is provided with a positioning shaft which is inserted into said hollow shaft, said motor drives said stirring shaft and said fan blades to rotate.

5. The rod-shaped cooking machine according to claim 4, a bearing surface of said ring seat is provided with said through hole, said stirring rod passes through said through hole, said stirring blade member is between said ring seat and said bottom cover.

6. The rod-shaped cooking machine according to claim 4, wherein a circuit board mounting frame is mounted on said motor isolation slot, said main PCB board is connected with said circuit board mounting frame.

7. The rod-shaped cooking machine according to claim 1, wherein the plastic cylinder is provided with a fuse, a controlled silicon, an anti-dry-burn NTC, stainless steel heat-generating sheets and a temperature detector.

8. The rod-shaped cooking machine according to claim 1, wherein said middle part of said housing is pivoted with a handle.

9. The rod-shaped cooking machine according to claim 1, wherein said housing is provided with a water lever detector, and said water lever detector is fixed connected with said main PCB board.

* * * * *